(12) United States Patent
Sharma et al.

(10) Patent No.: US 11,802,184 B2
(45) Date of Patent: Oct. 31, 2023

(54) PROCESS AND APPARATUS FOR PRECIPITATION OF POLY (PHENYLENE ETHER)

(71) Applicant: SABIC GLOBAL TECHNOLOGIES B.V., Bergen op Zoom (NL)

(72) Inventors: Niket Sharma, Blacksburg, VA (US); Deshmukh Shivajirao Sandesh, Bangalore (IN); Rajesh Chowdhury, Bangalore (IN); Atul Pant, Bangalore (IN); Gaurav Mediratta, Bangalore (IN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 766 days.

(21) Appl. No.: 16/767,169

(22) PCT Filed: Jan. 8, 2019

(86) PCT No.: PCT/US2019/012604
§ 371 (c)(1),
(2) Date: May 27, 2020

(87) PCT Pub. No.: WO2019/139867
PCT Pub. Date: Jul. 18, 2019

(65) Prior Publication Data
US 2020/0308351 A1    Oct. 1, 2020

(30) Foreign Application Priority Data

Jan. 9, 2018 (EP) .................................... 18150707

(51) Int. Cl.
*C08J 3/14* (2006.01)
*B01D 9/00* (2006.01)

(52) U.S. Cl.
CPC .............. *C08J 3/14* (2013.01); *B01D 9/0054* (2013.01); *C08J 2371/12* (2013.01)

(58) Field of Classification Search
USPC ....................................................... 528/212
See application file for complete search history.

(56) References Cited

U.S. PATENT DOCUMENTS

| | | | |
|---|---|---|---|
| 3,365,525 A | 1/1968 | Schueler et al. |
| 3,896,196 A | 7/1975 | Dickey et al. |
| 3,923,738 A | 12/1975 | Van Sorge |
| 3,990,938 A | 11/1976 | Whitehouse |
| 4,012,461 A | 3/1977 | Van Brederode |
| 4,668,768 A | 5/1987 | Mendiratta et al. |
| 5,266,211 A | 11/1993 | Breuker et al. |
| 5,269,980 A | 12/1993 | Levendis et al. |
| 5,306,807 A | 4/1994 | Kailasam et al. |
| 6,407,200 B1 | 6/2002 | Singh et al. |
| 6,627,727 B1 | 9/2003 | Yoshida et al. |
| 6,787,633 B2 | 9/2004 | Peemans et al. |
| 2005/0049362 A1 | 3/2005 | Buckley et al. |
| 2005/0131108 A1 | 6/2005 | Yamamoto et al. |
| 2005/0171331 A1 | 8/2005 | Eduard Ingelbrecht |

FOREIGN PATENT DOCUMENTS

| | | |
|---|---|---|
| EP | 0255230 A1 | 2/1988 |
| EP | 0707876 A1 | 4/1996 |
| EP | 1209183 A1 | 5/2002 |
| EP | 1471091 A1 | 10/2004 |
| WO | 2012125170 A1 | 9/2012 |

OTHER PUBLICATIONS

International Search Report for the corresponding PCT Application No. PCT/US2019/012604; International Filing Date: Jan. 8, 2019; dated May 15, 2019. 7 pages.
Written Opinion for the corresponding PCT Application No. PCT/US2019/012604; International Filing Date: Jan. 8, 2019; dated May 15, 2019. 9 pages.

*Primary Examiner* — Terressa Boykin
(74) *Attorney, Agent, or Firm* — CANTOR COLBURN LLP (57) ABSTRACT

A process and system for the precipitation of poly(phenylene ether) is described. Precipitated poly(phenylene ether) obtained by the processes disclosed herein are in the form of poly(phenylene ether) particles having a bulk density of 150 to 500 kg/m³, preferably 250 to 500 kg/m³.

15 Claims, 2 Drawing Sheets

PROCESS AND APPARATUS FOR PRECIPITATION OF POLY (PHENYLENE ETHER)

CROSS-REFERENCE TO RELATED APPLICATIONS

This application is a National Stage application of PCT/US2019/012604, filed Jan. 8, 2019, which claims benefit of European Patent Application No. 18150707.0 filed on Jan. 9, 2018, both of which are incorporated by reference herein in their entirety.

BACKGROUND

Thermoplastic polymers, for example poly(phenylene ether)s, in powder or particulate form have a wide variety of applications, for example, powder coating applications, molding applications, and as additives. Polymer particles or powders can generally be prepared by processes including mechanical grinding or solvent precipitation.

There remains a need in the art for an improved process and apparatus for the preparation of poly(phenylene ether) particles having controlled size and size distribution. It would be a further advantage if a process could provide for recovering and recycling solvents used in the process.

BRIEF DESCRIPTION

A process for precipitating poly(phenylene ether) comprises introducing a poly(phenylene ether) solution comprising a poly(phenylene ether), and a solvent to a first feed tube equipped with an atomizer positioned at an outlet of the first feed tube, wherein the first feed tube is surrounded by a second feed tube configured to provide a first anti-solvent comprising water; atomizing the poly(phenylene ether) solution to provide an atomized poly(phenylene ether) solution; contacting the atomized poly(phenylene ether) solution with an anti-solvent to provide a slurry comprising a precipitated poly(phenylene ether); and recovering the precipitated poly (phenylene ether); wherein the precipitated polyphenylene ether is in the form of polyphenylene ether particles having a bulk density of 150 to 500 kg/m$^3$, preferably 250 to 500 kg/m$^3$.

A process for precipitating polyphenylene ether comprises introducing an anti-solvent to a mechanically stirred vessel containing a polyphenylene ether solution comprising a polyphenylene ether and a solvent to provide a mixture; agitating the mixture under conditions effective to provide precipitated polyphenylene ether particles having a bulk density of 150 to 500 kg/m$^3$, preferably 250 to 500 kg/m$^3$; and recovering the precipitated polyphenylene ether particles.

A process for precipitating poly(phenylene ether) comprises introducing an anti-solvent to a mechanically stirred vessel comprising a poly(phenylene ether) solution comprising a poly(phenylene ether) and a solvent to provide a slurry comprising a precipitated poly(phenylene ether); wherein introducing the anti-solvent comprises adding a first amount of the anti-solvent effective to provide a volume ratio of solvent to anti-solvent of 60:40 to 80:20, preferably 65:35 to 75:25, more preferably 68:32 to 72:28, and agitating the slurry for 10 to 90 minutes, preferably 20 to 70 minutes, more preferably 30 to 60 minutes; adding a second amount of the anti-solvent effective to provide a volume ratio of solvent to anti-solvent of 35:65 to 55:45, preferably 40:60 to 50:50, more preferably 43:57 to 47:53, and agitating the slurry for 10 to 90 minutes, preferably 20 to 70 minutes, more preferably 30 to 60 minutes; and adding a third amount of the anti-solvent effective to provide a volume ratio of solvent to anti-solvent of 10:90 to 30:70, preferably 15:85 to 25:75, more preferably 18:82 to 22:78, and agitating the slurry for 30 to 90 minutes, preferably 45 to 75 minutes; and recovering precipitated polyphenylene ether particles having a bulk density of 150 to 500 kg/m$^3$, preferably 250 to 500 kg/m$^3$.

A system for precipitating poly(phenylene ether) comprises a first feed tube equipped with an atomizer and having a poly(phenylene ether) solution stream comprising a poly (phenylene ether) and a solvent; a second feed tube surrounding the first feed tube having a first anti-solvent stream, wherein the first anti-solvent stream is configured to contact the poly(phenylene ether) solution stream upon discharge from the first feed tube; a third feed tube having a second anti-solvent stream, and configured to receive an outlet stream from the first and second feed tubes; a mechanically stirred vessel downstream of the third feed tube, wherein the mechanically stirred vessel is configured to receive an outlet stream from the third feed tube, wherein the outlet stream from the third feed tube comprises poly(phenylene ether) particles; a condenser configured to receive vaporized liquid from the mechanically stirred vessel; and a filter configured to receive an outlet stream from the mechanically stirred vessel, wherein the filter is configured to recover polyphenylene ether particles having a bulk density of 150 to 500 kg/m$^3$, preferably 250 to 500 kg/m$^3$.

A system for precipitating poly(phenylene ether) comprises a first feed tube equipped with an atomizer and having a poly(phenylene ether) solution stream comprising a poly (phenylene ether) and a solvent; a second feed tube surrounding the first feed tube having a first anti-solvent stream, wherein the first anti-solvent stream is configured to contact the poly(phenylene ether) solution stream upon discharge from the first feed tube; a mechanically stirred vessel, wherein the mechanically stirred vessel is configured to receive an outlet stream from the first and second feed tubes, wherein the outlet stream comprises polyphenylene ether particles having a bulk density of 150 to 500 kg/m$^3$, preferably 250 to 500 kg/m$^3$.

The above described and other features are exemplified by the following figures and detailed description.

BRIEF DESCRIPTION OF THE DRAWINGS

The following figures represent exemplary embodiments.

DETAILED DESCRIPTION

The present inventors have discovered improved processes and apparatuses for preparing poly(phenylene ether) particles. Presently used processes can have difficulty controlling the precipitation to achieve a desired particle size, particularly with viscous polymer solutions. Additionally, current processes can also form threads or fibers as opposed to particles, and accurate control of solvent composition is often needed. The present inventors have sought to overcome the above-described technical limitations. The processes disclosed herein advantageously use an atomizer to generate the precipitated poly(phenylene ether) or include addition of specific amounts of an anti-solvent to a poly(phenylene ether) solution with agitation to provide the precipitated poly(phenylene ether). Apparatuses that can be used to carry out the methods, particularly those including an atomizer, are also described herein.

Accordingly, an aspect of the present disclosure is a process for precipitating poly(phenylene ether). The process includes introducing a poly(phenylene ether) solution to a first feed tube equipped with an atomizer positioned at an outlet of the first feed tube. The method further includes atomizing the poly(phenylene ether) solutions to provide an atomized poly(phenylene ether) solution, and contacting the atomized poly(phenylene ether) solution with an anti-solvent to provide a slurry comprising a precipitated poly(phenylene ether). The method can further include recovering the precipitated poly(phenylene ether), and the precipitated poly(phenylene ether) can be in the form of poly(phenylene ether) particles. The polyphenylene ether particles can have a bulk density of 150 to 500 kilograms per cubic meters ($kg/m^3$), preferably 250 to 500 $kg/m^3$. In some embodiments, the polyphenylene ether particles can have an average diameter of 10 micrometers ($\mu m$) to 5 millimeters (mm). The range can include or exclude the lower limit or the upper limit. Within this range, the lower limit or the upper limit can be selected from 10 $\mu m$, 15 $\mu m$, 25 $\mu m$, 50 $\mu m$, 100 $\mu m$, 250 $\mu m$, 500 $\mu m$, 1 mm, 2 mm, 3 mm, 4 mm and 5 mm. Average particle diameter can be determined using techniques which are generally known, such as laser light scattering techniques.

There is no particular limitation on the particle size analysis techniques used to determine the particle sizes resulting from the presently disclosed methods. Preferred techniques can include, for example, laser diffraction and laser back-scattering techniques, especially laser back-scattering techniques providing particle counting. Such techniques are known in the art and particle size analysis instruments employing them are commercially available as, for example, the particle counting, laser back-scattering instruments sold as FBRM D600R and M600P by Lasentec, Microtrac X100 analyzer by Infra Scientific, and Coulter LS200 by Beckman Coulter.

The poly(phenylene ether) solution provided by the first feed tube can be a product stream obtained directly from a method of manufacturing the poly(phenylene ether). In some embodiments, the poly(phenylene ether) solution can comprise an "as synthesized" poly(phenylene ether) which has not undergone further processing or purification. In some embodiments, the poly(phenylene ether) solution can be prepared independent of any manufacturing processes (i.e., the poly(phenylene ether) has been purified and the solution prepared using the purified poly(phenylene ether) which is substantially free of impurities or residues that can be associated with an "as synthesized" poly(phenylene ether).

The poly(phenylene ether) solution can generally have any concentration of poly(phenylene ether). For example, the poly(phenylene ether) solution can comprise 1 to 50 weight percent of the poly(phenylene ether), based on the total weight of the solution. Within this range, the poly(phenylene ether) concentration can be at least 5 weight percent, or at least 10 weight percent or at least 20 weight percent or at least 25 weight percent. Also within this range, the poly(phenylene ether) concentration can be up to 45 weight percent, or up to 40 weight percent, or up to 30 weight percent, or up to 20 weight percent or up to 15 weight percent. In some embodiments, the poly(phenylene ether) solution can have a viscosity of less than 65 centipoise (cP).

In some embodiments, the first feed tube can be surrounded by a second feed tube configured to provide a first anti-solvent comprising water.

The temperatures of the poly(phenylene ether) solution and the first anti-solvent immediately before they are combined will vary according to many factors, including, for example, the poly(phenylene ether) composition, the poly(phenylene ether) intrinsic viscosity, the poly(phenylene ether) concentration in the solution, the solvent type, the anti-solvent type, and the weight ratio of poly(phenylene ether) solution to anti-solvent. In an embodiment, the atomized poly(phenylene ether) solution is at a temperature of 60 to 100° C. just prior to contacting the first anti-solvent, and the first anti-solvent is at a temperature of 15 to 60° C. Within these ranges, the poly(phenylene ether) solution temperature can be at least 70° C., or at least 80° C.; and the poly(phenylene ether) solution temperature can be up to 95° C., or up to about 90° C. Also within these ranges, the first anti-solvent temperature can be at least 20° C., or at least 25° C.; and the first anti-solvent temperature can be up to 65° C., or up to 70° C. The temperature of the combined poly(phenylene ether)-anti-solvent slurry can preferably be 30 to 75° C.

The process can further include introducing the slurry into a mechanically stirred vessel. The slurry can generally introduced at any point of the stirred vessel but preferably is introduced from the top of the mechanically stirred vessel. The mechanically stirred vessel can be at a temperature of 20 to 100° C., for example 30 to 80° C.

In some embodiments, the outlet of the first feed tube is located at an end of a third feed tube configured to provide a second anti-solvent. The third feed tube can have an inlet configured to provide the second anti-solvent. Without wishing to be bound by theory, it is believed that introducing the second anti-solvent separate from the first anti-solvent can aid in achieving a desired particle size. Without the introduction of the first and second anti-solvents separately, control of particle size may not be achieved. The second anti-solvent can comprise, for example, methanol, ethanol, isopropanol, n-butanol, acetone, methyl ethyl ketone, or a combination comprising at least one of the foregoing. The weight ratio of the solvent to the first anti-solvent to the second anti-solvent can depend on the particular solvents selected and their miscibility. For example, in some embodiments, the weight ratio of the solvent to the first anti-solvent to the second anti-solvent can be 1 to 10:5 to 20:90 to 100.

The atomized poly(phenylene ether), after contacting the first and second anti-solvents, can be transported to a mechanically stirred vessel equipped with an agitator, a filter unit, and a condenser. Thus, introduction of the precipitated poly(phenylene ether) to the stirred vessel can facilitate removal of the solvent. In some embodiments, solvent removed from the mechanically stirred vessel via the condenser can be collected and recycled. In some embodiments, the precipitated poly(phenylene ether) can be cooled prior to filtering or isolating the poly(phenylene ether) particles.

In some embodiments, the outlet of the first feed tube can be located in an impeller zone of the mechanically stirred vessel, and the mechanically stirred vessel comprises the second anti-solvent.

The mechanically stirred vessel can comprise an impeller, preferably operating at an impeller tip speed of 1 to 6 meters per second.

The atomizer can generally be any type of atomizer. For example, suitable atomizers can include a high-pressure nozzle, a rotary atomizer, a twin-flow atomizer, a pressure-swirl single-fluid atomizer, a pressure-swirl two-fluid atomizer, a high pressure orifice atomizer, or a sonication-assisted atomizer. In some embodiments, the atomizer can be a pressure-swirl single-fluid atomizer, a pressure-swirl two-fluid atomizer, a high pressure orifice atomizer, or a sonication-assisted atomizer. The size of the droplets afforded by the atomizer of the present process can be controlled by changing the operating parameters of the atomizer (i.e., the pressure at the nozzle) or by changing the nozzle of the atomizer itself (i.e., altering the size of the openings through which the poly(phenylene ether) solution is ejected).

Figure 3:
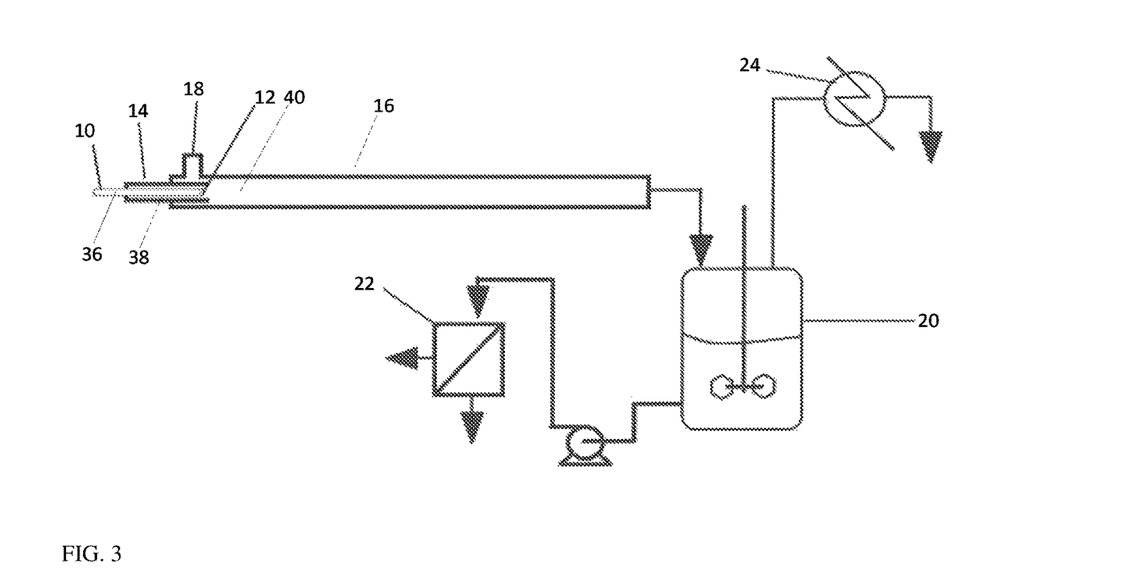
FIG. 3 is a schematic illustration of a process and system according to an embodiment of the present disclosure.

In a specific embodiment, a process for precipitating poly(phenylene ether) can be as shown in FIG. 3. The process comprises introducing a poly(phenylene ether) solution comprising the poly(phenylene ether) and a solvent to a first feed tube 10 equipped with an atomizer 12 positioned at an outlet of the first feed tube. The first feed tube 10 is surrounded by a second feed tube 14 configured to provide the second anti-solvent comprising water. The outlet of the first feed tube comprising the atomizer 12 is located at an end of a third feed tube 16 having an inlet 18 configured to provide a second anti-solvent. The process further comprises atomizing the poly(phenylene ether) solution to provide an atomized poly(phenylene ether) solution, and contacting the atomized poly(phenylene ether) solution with the first and second anti-solvents to provide a slurry comprising a precipitated poly(phenylene ether). The slurry is introduced to a mechanically stirred vessel 20 via the third feed tube 16 from the top of the stirred vessel. The precipitated poly(phenylene ether) can be recovered from the slurry via filter unit 22 and the anti-solvent can be collected using condenser 24. The precipitated poly(phenylene ether) can be in the form of poly(phenylene ether) particles. The polyphenylene ether particles can have a bulk density of 150 to 500 kilograms per cubic meters ($kg/m^3$), preferably 250 to 500 $kg/m^3$. The polyphenylene ether particles can have an average diameter of 10 micrometers to 5 millimeters. The range can include or exclude the lower limit or the upper limit. Within this range, the lower limit or the upper limit can be selected from 10 µm, 15 µm, 25 µm, 50 µm, 100 µm, 250 µm, 500 µm, 1 mm, 2 mm, 3 mm, 4 mm and 5 mm.

Figure 4:
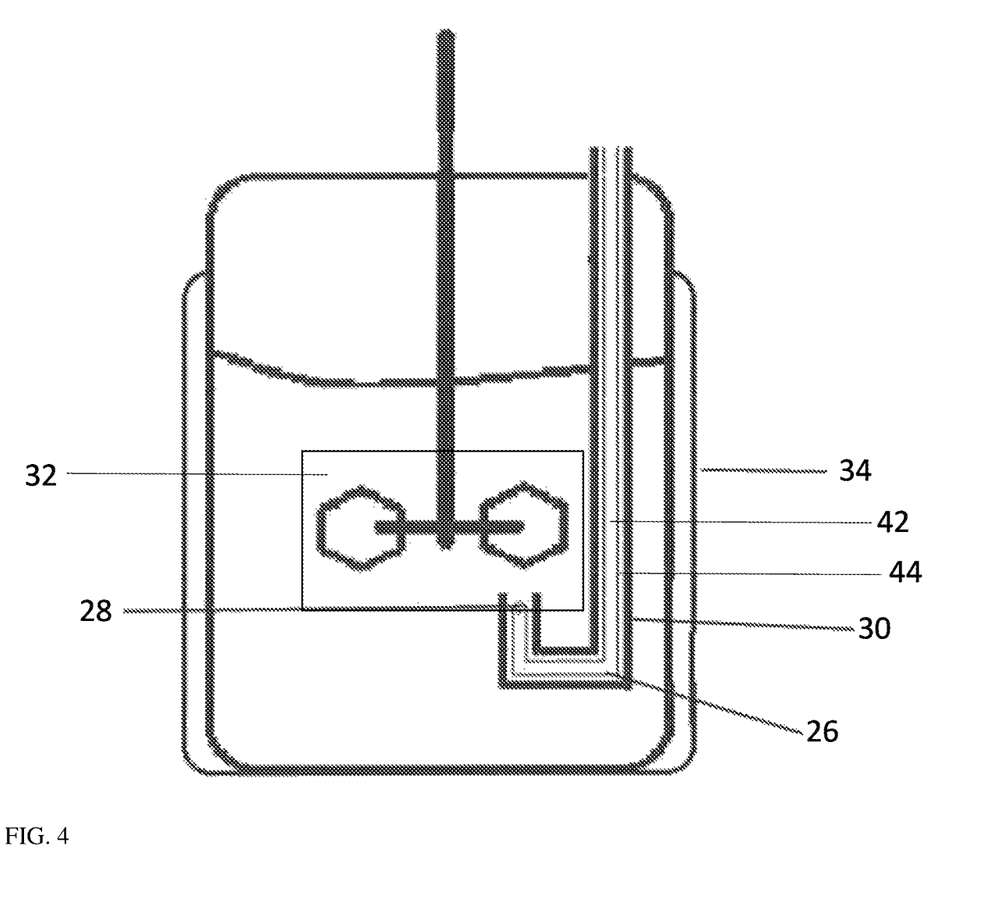
FIG. 4 is a schematic illustration of a process and system according to an embodiment of the present disclosure.

In another specific embodiment, a process for precipitating poly(phenylene ether) can be as shown in FIG. 4. The process comprises introducing a poly(phenylene ether) solution comprising the poly(phenylene ether) and a solvent to a first feed tube 26 equipped with an atomizer 28 positioned at an outlet of the first feed tube. The first feed tube 26 is surrounded by a second feed tube 30 configured to provide the second anti-solvent comprising water. The outlet of the first feed tube comprising the atomizer 28 is located in an impeller zone (i.e., substantially close to the impeller, for example in area 32) of a mechanically stirred vessel 34 comprising a second anti-solvent, which can be, for example, a jacketed vessel. The process further comprises atomizing the poly(phenylene ether) solution to provide an atomized poly(phenylene ether) solution, and contacting the atomized poly(phenylene ether) solution with the first and second anti-solvents to provide a slurry comprising a precipitated poly(phenylene ether). The precipitated poly(phenylene ether) can be recovered from the slurry via a filter unit (not shown in FIG. 4). The precipitated poly(phenylene ether) can be in the form of poly(phenylene ether) particles. The polyphenylene ether particles can have a bulk density of 150 to 500 kilograms per cubic meters ($kg/m^3$), preferably 250 to 500 $kg/m^3$. The polyphenylene ether particles can have an average diameter of 10 micrometers to 5 millimeters. The range can include or exclude the lower limit or the upper limit. Within this range, the lower limit or the upper limit can be selected from 10 µm, 15 µm, 25 µm, 50 µm, 100 µm, 250 µm, 500 µm, 1 mm, 2 mm, 3 mm, 4 mm and 5 mm.

Another aspect of the present disclosure is a process for precipitating poly(phenylene ether) comprising an anti-solvent to a mechanically stirred vessel containing a polyphenylene ether solution comprising a polyphenylene ether and a solvent to provide a mixture. The mechanically stirred vessel can be at a temperature of 20 to 100° C., for example 30 to 80° C. In some embodiments, the polyphenylene ether solution can be maintained at a temperature of 30 to 75° C., preferably between 60 to 65° C. The mixture can be agitated under conditions effective to provide precipitated poly(phenylene ether) particles. The polyphenylene ether particles can have a bulk density of 150 to 500 kilograms per cubic meters ($kg/m^3$), preferably 250 to 500 $kg/m^3$. The polyphenylene ether particles can have an average diameter of 10 micrometers to 5 millimeters. The range can include or exclude the lower limit or the upper limit. Within this range, the lower limit or the upper limit can be selected from 10 µm, 15 µm, 25 µm, 50 µm, 100 µm, 250 µm, 500 µm, 1 mm, 2 mm, 3 mm, 4 mm and 5 mm. Agitating the slurry can be, for example, using an impeller, preferably operating at an impeller tip speed of 1 to 6 meters per second.

The process further comprises recovering the precipitated poly(phenylene ether) particles.

The average residence time of the precipitated poly(phenylene ether) in the mechanically stirred vessel can be, for example, 1 to 60 minutes.

The anti-solvent comprises methanol, ethanol, isopropanol, n-butanol, acetone, methyl ethyl ketone, or a combination comprising at least one of the foregoing.

The weight ratio of the solvent to the anti-solvent can depend on the particular solvents selected and their miscibility.

Another aspect of the present disclosure is a process for precipitating poly(phenylene ether) comprising introducing an anti-solvent to a mechanically stirred vessel comprising a poly(phenylene ether) solution comprising a poly(phenylene ether) and a solvent to provide a slurry comprising precipitated poly(phenylene ether). Introducing the anti-solvent comprises adding a first amount of the anti-solvent effective to provide a volume ratio of solvent to anti-solvent of 60:40 to 80:20, preferably 65:35 to 75:25, more preferably 68:32 to 72:28, and agitating the slurry for 10 to 90 minutes, preferably 20 to 70 minutes, more preferably 30 to 60 minutes; adding a second amount of the anti-solvent effective to provide a volume ratio of solvent to anti-solvent of 35:65 to 55:45, preferably 40:60 to 50:50, more preferably 43:57 to 47:53, and agitating the slurry for 10 to 90 minutes, preferably 20 to 70 minutes, more preferably 30 to 60 minutes; and adding a third amount of the anti-solvent effective to provide a volume ratio of solvent to anti-solvent of 10:90 to 30:70, preferably 15:85 to 25:75, more preferably 18:82 to 22:78, and agitating the slurry for 30 to 90 minutes, preferably 45 to 75 minutes. The process further comprises recovering precipitated poly(phenylene ether) particles. The polyphenylene ether particles can have a bulk density of 150 to 500 kilograms per cubic meters ($kg/m^3$), preferably 250 to 500 $kg/m^3$. The polyphenylene ether particles can have an average diameter of 10 micrometers to

5 millimeters. The range can include or exclude the lower limit or the upper limit. Within this range, the lower limit or the upper limit can be selected from 10 μm, 15 μm, 25 μm, 50 μm, 100 μm, 250 μm, 500 μm, 1 mm, 2 mm, 3 mm, 4 mm and 5 mm. The anti-solvent can include methanol, ethanol, isopropanol, n-butanol, acetone, methyl ethyl ketone, or a combination comprising at least one of the foregoing.

Recovering the precipitated poly(phenylene ether) in any of the above embodiments can be by filtration, centrifugation, or the like, or a combination comprising at least one of the foregoing recovery techniques. Preferably recovering the precipitated poly(phenylene ether) is by filtration.

The poly(phenylene ether) solution in the above described processes includes a poly(phenylene ether) and a solvent. Poly(phenylene ether)s include those comprising repeating structural units having the formula wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst. In some embodiments, the poly (phenylene ether) comprises 2,6-dimethyl-1,4-phenylene ether repeating units, that is, repeating units having the structure 2,3,6-trimethyl-1,4-phenylene ether repeating units, 2-methyl-6-phenyl-1,4-phenylene ether repeating units, 2,6-diphenyl-1,4-phenylene ether repeating units or a combination comprising at least one of the foregoing. In some embodiments, the poly(phenylene ether) can further comprise repeating units derived from tetramethyl bisphenol A.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

The poly(phenylene ether) can comprise a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure wherein each occurrence of $R^8$ is independently hydrogen, $C_1$-$C_{12}$ hydrocarbyl or $C_1$-$C_{12}$ halohydrocarbyl; and two terminal units having the structure wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxyl.

In some embodiments, the monohydric phenol comprises 2,6-dimethylphenol, and the hydroxyaryl-terminated polysiloxane has the structure wherein n is, on average, 5 to 100, or 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

In some embodiments, the poly(phenylene ether) is a poly(2,6-dimethyl-1,4-phenylene ether). In some embodiments, the poly(phenylene ether) has an intrinsic viscosity of 0.25 to 1.60 deciliter per gram measured by Ubbelohde viscometer at 25° C. in chloroform. Within this range, the poly(phenylene ether) intrinsic viscosity can be 0.3 to 0.65 deciliter per gram, or 0.35 to 0.5 deciliter per gram, or 0.4 to 0.5 deciliter per gram. Also within this range, in some embodiments the poly(phenylene ether) can have an intrinsic viscosity of 1.40 to 1.60. In some embodiments, the poly(phenylene ether) is a poly(2,6-dimethyl-1,4-phenylene ether) having an intrinsic viscosity of 0.30 to 1.60 deciliter per gram. In some embodiments, the poly(phenylene ether) is a poly(2,6-dimethyl-1,4-phenylene ether) having an intrinsic viscosity of 1.40 to 1.60.

The solvent of the poly(phenylene ether) solution can be any solvent that is generally regarded as a good solvent for poly(phenylene ether)s. For example, the solvent can comprise toluene, benzene, xylene, or a combination comprising at least one of the foregoing. The concentration of the poly(phenylene ether) in the solution can be within the range of the solubility of the poly(phenylene ether) in the selected solvent.

Another aspect of the present disclosure is a system for the precipitation of a poly(phenylene ether). The system can be as shown in FIG. 3, and can comprise a first feed tube 10 equipped with an atomizer 12 and having a polyphenylene ether solution stream 36 comprising a polyphenylene ether and a solvent. A second feed tube 14 surrounds the first feed tube and comprises a first anti-solvent stream 38, wherein the first anti-solvent stream is configured to contact the polyphenylene ether solution stream upon discharge from the first feed tube. A third feed tube 16 having a second anti-solvent stream 40 is configured to receive an outlet stream from the first and second feed tubes. A mechanically stirred vessel 20 is positioned downstream of the third feed tube, wherein the mechanically stirred vessel is configured to receive an outlet stream from the third feed tube, wherein the outlet stream from the third feed tube comprises polyphenylene ether particles. The system further comprises a condenser 24 configured to receive vaporized liquid from the mechanically stirred vessel and a filter 22 configured to receive an outlet stream from the mechanically stirred vessel, wherein the filter is configured to recover polyphenylene ether particles having an average diameter of 10 micrometers to 5 millimeters.

In yet another embodiment, a system for precipitating poly(phenylene ether) can be as shown in FIG. 4, and can comprise a first feed tube 26 equipped with an atomizer 28 and including a polyphenylene ether solution stream 42 comprising a polyphenylene ether and a solvent. The system includes a second feed tube 30 surrounding the first feed tube having a first anti-solvent stream 44, wherein the first anti-solvent stream is configured to contact the polyphenylene ether solution stream upon discharge from the first feed tube. A mechanically stirred vessel 34 is configured to receive an outlet stream from the first and second feed tubes, wherein the outlet stream comprises polyphenylene ether particles having an average diameter of 10 micrometers to 5 millimeters.

Using the processes and systems described herein, the present inventors have provided an improved process for precipitating poly(phenylene ether) to provide poly(phenylene ether) particles having controlled size and size distribution.

This disclosure is further illustrated by the following examples, which are non-limiting.

EXAMPLES

Comparative Example 1

Polyphenylene ether particles were obtained according to the following process. Methanol (95 milliliters) was added to a 250 milliliter glass jacketed reactor vessel with a 4-blade impeller having a diameter of about 4 centimeters, and operating at 1000 rpm to give an impeller tip speed of 2.09 meters per second. The temperature was maintained at 60° C. A polymer solution (25 milliliters) having a concentration of 7 weight percent in toluene was slowly added dropwise into the reactor over a period of 30 to 150 minutes. The speed of stirring was maintained in the range of 800-1000 rpm and continued for an additional 120 minutes. The agitation was stopped and the contents of the reactor was filtered into a glass plate. The collected polymer material was kept in a vacuum oven at 110° C. for 12 hours. The dried polymer particles had a bulk density of 140 kg/m$^3$.

Example 1

Polyphenylene ether particles were prepared according to the method of the present disclosure. A polymer solution (25 milliliters) having a concentration of 7 weight percent in toluene was added to a 250 milliliter glass jacketed reactor vessel with a 4-blade impeller having a diameter of about 4 centimeters, and operating at 1000 rpm to give an impeller tip speed of 2.09 meters per second. The temperature was maintained at 60° C. Methanol was slowly added dropwise into the reactor in three stages, one after the other, with volumes of 10 milliliters in 60 minutes, 20 milliliters in 60 minutes, and the remaining 65 milliliters over a period of 30 minutes. The speed of stirring was maintained in the range of 800-1000 rpm, and was continued for an additional 120 minutes. The agitation was stopped and the contents of the reactor was filtered into a glass plate. The collected polymer material was kept in a vacuum oven at 110° C. for 12 hours. The dried polymer particles had a bulk density of 265 kg/m$^3$.

Figure 1:
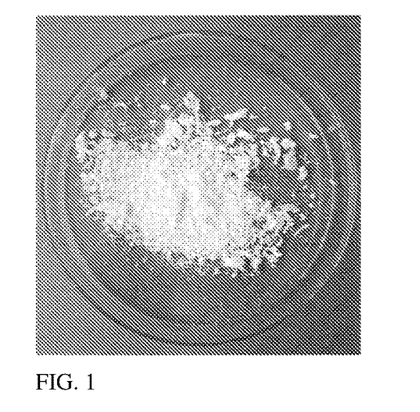
FIG. 1 is a photograph of poly(phenylene ether) particles prepared according to a comparative process.
Figure 2:
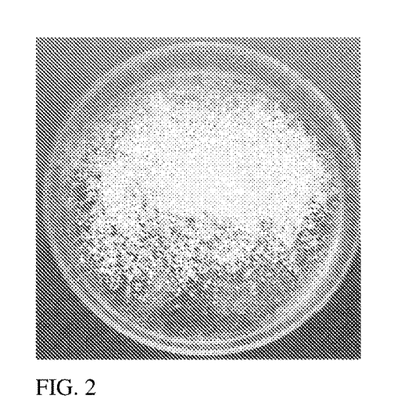
FIG. 2 shows a photograph of poly(phenylene ether) particles prepared according to a process and using an apparatus according to an embodiment of the present disclosure.

The precipitated polyphenylene ether obtained by the process of Comparative Example 1 is shown in the photograph of FIG. 1. In contrast, the precipitated polyphenylene ether obtained by the process of Example 1 is shown in the photograph of FIG. 2. From FIGS. 1 and 2, it can be seen that the process according to the present disclosure provides more uniform particle size distribution. The process described in Example 1 also afforded particles having an increased bulk density of 265 kg/m$^3$ compared to 140 kg/m$^3$ for Comparative Example 1, indicative of the smaller, more uniform particle size obtained by Example 1.

This disclosure further encompasses the following non-limiting aspects.

Aspect 1: A process for precipitating polyphenylene ether, the process comprising introducing a polyphenylene ether solution comprising a polyphenylene ether, and a solvent to a first feed tube equipped with an atomizer positioned at an outlet of the first feed tube, wherein the first feed tube is surrounded by a second feed tube configured to provide a first anti-solvent comprising water; atomizing the polyphenylene ether solution to provide an atomized polyphenylene ether solution; contacting the atomized polyphenylene ether solution with an anti-solvent to provide a slurry comprising a precipitated polyphenylene ether; and recovering the precipitated polyphenylene ether; wherein the precipitated polyphenylene ether is in the form of polyphenylene ether particles having a bulk density of 150 to 500 kg/m$^3$, preferably 250 to 500 kg/m$^3$.

Aspect 2: The process of aspect 1, wherein the precipitated polyphenylene ether is in the form of polyphenylene ether particles having an average diameter of 10 micrometers to 5 millimeters.

Aspect 3: The process of aspect 1 or 2, wherein the outlet of the first feed tube is located at an end of a third feed tube configured to provide a second anti-solvent, preferably wherein the second anti-solvent comprises methanol, ethanol, isopropanol, n-butanol, acetone, methyl ethyl ketone, or a combination comprising at least one of the foregoing.

Aspect 4: The process of any one or more of aspects 1 to 3, further comprising introducing the slurry to a mechanically stirred vessel, preferably from the top of the mechanically stirred vessel.

Aspect 5: The process of aspect 1 or 2, wherein the outlet of the first feed tube is located in an impeller zone of a mechanically stirred vessel, wherein the mechanically stirred vessel comprises a second anti-solvent.

Aspect 6: The process of any one or more of aspects 1 to 5, wherein contacting the polyphenylene ether solution and the first anti-solvent forms a combined stream having a temperature of 30 to 75° C.

Aspect 7: The process of any one or more of aspects 1 to 6, wherein the average residence time of the precipitated polyphenylene ether in the mechanically stirred vessel is 1 to 60 minutes.

Aspect 8: The process of any one or more of aspects 1 to 7, wherein the atomizer is a pressure-swirl single-fluid atomizer, a pressure-swirl two-fluid atomizer, a high pressure orifice atomizer, or a sonication-assisted atomizer.

Aspect 9: A process for precipitating polyphenylene ether, the process comprising introducing a polyphenylene ether solution comprising a polyphenylene ether and a solvent to a mechanically stirred vessel comprising a first anti-solvent consisting of water to provide a slurry comprising a precipitated polyphenylene ether; introducing a second anti-solvent to the mechanically stirred vessel; agitating the slurry under conditions effective to provide precipitated polyphenylene ether particles having a bulk density of 150 to 500 kg/m$^3$, preferably 250 to 500 kg/m$^3$; and recovering the precipitated polyphenylene ether particles.

Aspect 9: The process of aspect 8, wherein the second anti-solvent comprises methanol, ethanol, isopropanol, n-butanol, acetone, methyl ethyl ketone, or a combination comprising at least one of the foregoing.

Aspect 10: A process for precipitating polyphenylene ether, the process comprising introducing an anti-solvent to a mechanically stirred vessel comprising a polyphenylene ether solution comprising a polyphenylene ether and a solvent to provide a slurry comprising a precipitated polyphenylene ether; wherein introducing the anti-solvent comprises adding a first amount of the anti-solvent effective to provide a volume ratio of solvent to anti-solvent of 60:40 to 80:20, preferably 65:35 to 75:25, more preferably 68:32 to 72:28, and agitating the slurry for 10 to 90 minutes, preferably 20 to 70 minutes, more preferably 30 to 60 minutes; adding a second amount of the anti-solvent effective to provide a volume ratio of solvent to anti-solvent of 35:65 to 55:45, preferably 40:60 to 50:50, more preferably 43:57 to 47:53, and agitating the slurry for 10 to 90 minutes, preferably 20 to 70 minutes, more preferably 30 to 60 minutes; and adding a third amount of the anti-solvent effective to provide a volume ratio of solvent to anti-solvent of 10:90 to 30:70, preferably 15:85 to 25:75, more preferably 18:82 to 22:78, and agitating the slurry for 30 to 90 minutes, preferably 45 to 75 minutes; and recovering precipitated polyphenylene ether particles having a bulk density of 150 to 500 kg/m$^3$, preferably 250 to 500 kg/m$^3$.

Aspect 11: The process of aspect 10, wherein the anti-solvent comprises methanol, ethanol, isopropanol, n-butanol, acetone, methyl ethyl ketone, or a combination comprising at least one of the foregoing.

Aspect 12: The process of any one or more of aspects 1 to 11, wherein recovering the precipitated polyphenylene ether is by filtration, centrifugation, or a combination comprising at least one of the foregoing.

Aspect 13: The process of any one or more of aspects 1 to 11, wherein the polyphenylene ether is a poly(2,6-dimethyl-1,4-phenylene ether) having an intrinsic viscosity of 0.30 to 1.60 deciliter per gram, determined by Ubbelohde viscometer at 25° C. in chloroform.

Aspect 14: The process of any one or more of aspects 1 to 12, wherein the solvent comprises toluene, benzene, xylene, or a combination comprising at least one of the foregoing.

Aspect 15: A system for precipitating polyphenylene ether comprising: a first feed tube 10 equipped with an atomizer 12 and having a polyphenylene ether solution stream 36 comprising a polyphenylene ether and a solvent; a second feed tube 14 surrounding the first feed tube having a first anti-solvent stream 38, wherein the first anti-solvent stream is configured to contact the polyphenylene ether solution stream upon discharge from the first feed tube; a third feed tube 16 having a second anti-solvent stream 40, and configured to receive an outlet stream from the first and second feed tubes; a mechanically stirred vessel 20 downstream of the third feed tube, wherein the mechanically stirred vessel is configured to receive an outlet stream from the third feed tube, wherein the outlet stream from the third feed tube comprises polyphenylene ether particles; a condenser 24 configured to receive vaporized liquid from the mechanically stirred vessel; and a filter 22 configured to receive an outlet stream from the mechanically stirred vessel, wherein the filter is configured to recover polyphenylene ether particles having an average diameter of 10 micrometers to 5 millimeters.

Aspect 16: A system for precipitating polyphenylene ether comprising: a first feed tube 26 equipped with an atomizer 28 and having a polyphenylene ether solution stream 42 comprising a polyphenylene ether and a solvent; a second feed tube 30 surrounding the first feed tube having a first anti-solvent stream 44, wherein the first anti-solvent stream is configured to contact the polyphenylene ether solution stream upon discharge from the first feed tube; a mechanically stirred vessel 34, wherein the mechanically stirred vessel is configured to receive an outlet stream from the first and second feed tubes, wherein the outlet stream comprises polyphenylene ether particles having an average diameter of 10 micrometers to 5 millimeters.

The methods and systems can alternatively comprise, consist of, or consist essentially of, any appropriate components or steps herein disclosed. The methods and systems can additionally, or alternatively, be formulated so as to be devoid, or substantially free, of any steps, components, materials, ingredients, adjuvants, or species that are otherwise not necessary to the achievement of the function or objectives of the methods and systems.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process for precipitating polyphenylene ether, the process comprising
   introducing an anti-solvent to a mechanically stirred vessel containing a polyphenylene ether solution comprising a polyphenylene ether and a solvent to provide a mixture, wherein the polyphenylene ether solution comprises the polyphenylene ether in an amount of up to 15 weight percent;
   agitating the mixture under conditions effective to provide precipitated polyphenylene ether particles having a bulk density of 150 to 500 kg/m$^3$; and recovering the precipitated polyphenylene ether particles.

2. The process of claim 1, wherein the anti-solvent comprises methanol, ethanol, isopropanol, n-butanol, acetone, methyl ethyl ketone, or a combination comprising at least one of the foregoing.

3. A process for precipitating polyphenylene ether, the process comprising
   introducing an anti-solvent to a mechanically stirred vessel comprising a polyphenylene ether solution comprising a polyphenylene ether and a solvent to provide a mixture comprising a precipitated polyphenylene ether, wherein the polyphenylene ether solution comprises the polyphenylene ether in an amount of up to 15 weight percent;

wherein introducing the anti-solvent comprises
adding a first amount of the anti-solvent effective to provide a volume ratio of solvent to anti-solvent of 60:40 to 80:20, and agitating the slurry for 10 to 90 minutes;
adding a second amount of the anti-solvent effective to provide a volume ratio of solvent to anti-solvent of 35:65 to 55:45, and agitating the slurry for 10 to 90 minutes; and
adding a third amount of the anti-solvent effective to provide a volume ratio of solvent to anti-solvent of 10:90 to 30:70, and agitating the slurry for 30 to 90 minutes; and
recovering precipitated polyphenylene ether particles having a bulk density of 150 to 500 kg/m$^3$.

4. The process of claim 3, wherein the anti-solvent comprises methanol, ethanol, isopropanol, n-butanol, acetone, methyl ethyl ketone, or a combination comprising at least one of the foregoing.

5. The process of claim 1, wherein the polyphenylene ether is a poly(2,6-dimethyl-1,4-phenylene ether) having an intrinsic viscosity of 0.30 to 1.60 deciliter per gram, determined by Ubbelohde viscometer at 25° C. in chloroform.

6. The process of claim 1, wherein the solvent comprises toluene, benzene, xylene, or a combination comprising at least one of the foregoing.

7. The process of claim 1, wherein the polyphenylene ether solution is maintained at a temperature of 30 to 75° C.

8. A process for precipitating polyphenylene ether, the process comprising
introducing a polyphenylene ether solution comprising
a polyphenylene ether, and
a solvent
to a first feed tube equipped with an atomizer positioned at an outlet of the first feed tube, wherein the first feed tube is surrounded by a second feed tube configured to provide a first anti-solvent comprising water;
atomizing the polyphenylene ether solution to provide an atomized polyphenylene ether solution;
contacting the atomized polyphenylene ether solution with an anti-solvent to provide a slurry comprising a precipitated polyphenylene ether; and
recovering the precipitated polyphenylene ether;
wherein the precipitated polyphenylene ether is in the form of polyphenylene ether particles having a bulk density of 150 to 500 kg/m$^3$.

9. The process of claim 8, wherein the outlet of the first feed tube is located at an end of a third feed tube configured to provide a second anti-solvent.

10. The process of claim 8 further comprising introducing the slurry to a mechanically stirred vessel.

11. The process of claim 8, wherein the outlet of the first feed tube is located in an impeller zone of a mechanically stirred vessel, wherein the mechanically stirred vessel comprises a second anti-solvent.

12. The process of claim 8, wherein contacting the polyphenylene ether solution and the first anti-solvent forms a combined stream having a temperature of 30 to 75° C.

13. The process of claim 8, wherein the atomizer is a pressure-swirl single-fluid atomizer, a pressure-swirl two-fluid atomizer, a high pressure orifice atomizer, or a sonication-assisted atomizer.

14. A system for precipitating polyphenylene ether comprising:
a first feed tube 10 equipped with an atomizer 12 and having a polyphenylene ether solution stream 36 comprising a polyphenylene ether and a solvent;
a second feed tube 14 surrounding the first feed tube having a first anti-solvent stream 38, wherein the first anti-solvent stream is configured to contact the polyphenylene ether solution stream upon discharge from the first feed tube;
a third feed tube 16 having a second anti-solvent stream 40, and configured to receive an outlet stream from the first and second feed tubes;
a mechanically stirred vessel 20 downstream of the third feed tube, wherein the mechanically stirred vessel is configured to receive an outlet stream from the third feed tube, wherein the outlet stream from the third feed tube comprises polyphenylene ether particles;
a condenser 24 configured to receive vaporized liquid from the mechanically stirred vessel; and
a filter 22 configured to receive an outlet stream from the mechanically stirred vessel, wherein the filter is configured to recover polyphenylene ether particles having a bulk density of 150 to 500 kg/m$^3$.

15. A system for precipitating polyphenylene ether comprising:
a first feed tube 26 equipped with an atomizer 28 and having a polyphenylene ether solution stream 42 comprising a polyphenylene ether and a solvent;
a second feed tube 30 surrounding the first feed tube having a first anti-solvent stream 44, wherein the first anti-solvent stream is configured to contact the polyphenylene ether solution stream upon discharge from the first feed tube;
a mechanically stirred vessel 34, wherein the mechanically stirred vessel is configured to receive an outlet stream from the first and second feed tubes, wherein the outlet stream comprises polyphenylene ether particles having a bulk density of 150 to 500 kg/m$^3$.

* * * * *